United States Patent
Robertson et al.

(10) Patent No.: US 7,211,139 B2
(45) Date of Patent: May 1, 2007

(54) PROCESS FOR PREPARING NANOSCALE QUINACRIDONE

(75) Inventors: George N. Robertson, Loveland, OH (US); Edward H. Sung, Cincinnati, OH (US)

(73) Assignee: Sun Chemical Corporation, Parsippany, NJ (US)

( * ) Notice: Subject to any disclaimer, the term of this patent is extended or adjusted under 35 U.S.C. 154(b) by 0 days.

(21) Appl. No.: 11/120,680

(22) Filed: May 3, 2005

(65) Prior Publication Data

US 2006/0249052 A1  Nov. 9, 2006

(51) Int. Cl.
*C09B 48/00* (2006.01)

(52) U.S. Cl. .................. 106/497; 106/495; 546/49
(58) Field of Classification Search ................ 106/495, 106/497; 546/49
See application file for complete search history.

(56) References Cited

U.S. PATENT DOCUMENTS

| | | | | |
|---|---|---|---|---|
| 2,844,485 A | * | 7/1958 | Struve | 546/49 |
| 3,030,370 A | * | 4/1962 | Jackson | 546/49 |
| 3,313,491 A | * | 4/1967 | Tommaso et al. | 241/16 |
| 3,607,336 A | * | 9/1971 | Jaffe | 106/495 |
| 3,681,100 A | * | 8/1972 | Jaffe | 106/495 |
| 4,371,643 A | * | 2/1983 | Thomas | 524/88 |
| 4,760,144 A | * | 7/1988 | Jaffe | 546/49 |
| 4,857,646 A | * | 8/1989 | Jaffe | 546/49 |
| 5,084,100 A | * | 1/1992 | Bauman | 106/495 |
| 6,235,099 B1 | * | 5/2001 | Aida et al. | 106/31.65 |
| 6,284,890 B1 | * | 9/2001 | Mitina | 546/56 |
| 6,626,990 B2 | * | 9/2003 | Jeganathan et al. | 106/497 |
| 6,818,053 B2 | * | 11/2004 | Kasai et al. | 106/497 |
| 6,864,371 B2 | * | 3/2005 | Babler | 546/49 |
| 2004/0229057 A1 | * | 11/2004 | Cole et al. | 428/473.5 |

FOREIGN PATENT DOCUMENTS

| | | | |
|---|---|---|---|
| GB | 1226414 A | * | 3/1971 |
| JP | 3-277665 A | * | 12/1991 |
| JP | 4-178469 A | * | 6/1992 |

\* cited by examiner

*Primary Examiner*—Anthony J. Green
(74) *Attorney, Agent, or Firm*—Rademaker Nugent & Affleck; Theresa O'Rourke Nugent

(57) ABSTRACT

This invention relates to a method for production of nanoscale size quinacridones through a wet-salt attrition process by combining a crude quinacridone pigment in the presence of (i) an inorganic salt, (ii) an organic liquid in which the quinacridone pigment and salt are substantially insoluble, and (iii) a quinacridone derivative in an amount less than 10 wt. % relative to the quinacridone pigment; discharging the ground quinacridone pigment into water; adding an acid to produce a solution pH of 1.5 or lower; and isolating the quinacridone pigment.

24 Claims, No Drawings

PROCESS FOR PREPARING NANOSCALE QUINACRIDONE

FIELD OF THE INVENTION

The invention relates to a process for preparing nanoscale quinacridone pigments.

BACKGROUND OF THE INVENTION

Pigments used in ink jet printing applications must be of a small size. The particle size has an influence on the dispersion stability. Further, the Brownian motion of minute particles helps prevent flocculation and settling. The particle size thus should be selected to optimize the stability of the dispersion, consistent with the other requirements of the intended application for the dispersion. In ink jet ink applications, the pigment particles need to be sufficiently small to permit free flow of the ink through the ink jet printing device, especially at the ejecting nozzles which typically have a diameter in the range of 10 to 50 microns. !n addition, it also is desirable to use small particles for maximum color strength and gloss. The useful range of particle size is approximately 0.005 micron to 15 microns. Preferably, the pigment particle size should range from 0.005 to 1 micron. Similarly, the toner utilized in the electrophotographic process is keenly required to have a small particle size pigment for improving its image quality.

As initially produced and isolated, crude quinacridone pigments are generally unsuitable for use in inkjet applications and must be subjected to additional finishing steps that modify the quinacridone pigment particle size, particle shape, and/or crystal structure to provide good pigmentary quality.

Other such uses and applications including but not limited to paints, plastics and toners also require small particle size and good pigment quality.

Thus, there does not exist a process to produce small particle quinacridones having increased transparency and stability in application.

BRIEF SUMMARY OF THE INVENTION

It has now been found that the above objectives can be realized through a method for production of small particle size quinacridones using a wet-salt attrition process offering increased transparency in paint, plastics, ink and toner applications.

The present invention also provides a method for preparing a quinacridone pigment having small particle size by combining crude quinacridone pigment with an inorganic salt, organic liquid and a quinacridone derivative in milling equipment, optionally at elevated temperatures. The temperature is elevated and the combination is ground under high shear conditions so that the crude quinacridone pigment can be broken down into small crystal line particles.

Other objects and advantages of the present invention will become apparent from the following description and appended claims.

DETAILED DESCRIPTION OF THE INVENTION

The method of the present invention for conditioning an quinacridone pigment, comprises: (a) grinding a crude quinacridone pigment in the presence of (i) an inorganic salt and (ii) an organic liquid in which the crude quinacridone pigment and salt are substantially insoluble, (iii) a minor amount, relative to the crude quinacridone pigment, of a quinacridone pigment derivative, (b) discharging the crude quinacridone pigment mixture into water containing an acid or to which an acid is thereafter added in an amount sufficient to produce a solution pH of 1.5 or lower; and (c) isolating the conditioned quinacridone pigment.

Quinacridones

Quinacridones suitable for use in the present invention include but are not limited to unsubstituted quinacridone and quinacridone derivatives which can be prepared by any of several methods known in the art. Further suitable quinacridone pigments include but are not limited to unsubstituted or substituted (for example, with one or more alkyl, alkoxy, halogens such as chlorine, or other substituents typical of quinacridone pigments).

A crude quinacridone pigment for use in the process of the present invention includes linear unsubstituted or substituted quinacridones of the formula (I):

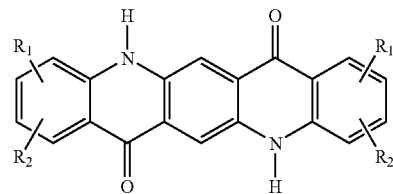

wherein substituents R, and $R_2$ are identical or different and are hydrogen, chlorine, bromine or flourine atoms or a C1–C4-alkyl.

The crude quinacridone of formula (I) may be prepared through any of a variety of methods known in the art.

Inorganic Salts

Suitable salts for salt grinding with the crude quinacridone include but are not limited to sodium chloride, potassium chloride, calcium chloride, zinc chloride, aluminum chloride, sodium sulfate, aluminum sulfate, calcium carbonate, sodium acetate, calcium acetate, sodium citrate, and potassium sodium tartrate. Sodium chloride is particularly convenient and preferred.

The milling of quinacridone pigment crude can be carried out in the presence of 3 to 12 times by weight of an inorganic salt relative to the pigment crude. A preferred milling mixture composition comprises sodium chloride in an amount of 8 to 10 times by weight relative to the pigment crude.

Liquids

Suitable liquids for use in salt grinding include but are not limited to liquids in which the quinacridone pigment and salt are substantially insoluble but which enable the physical transformation of crude quinacridone pigment to conditioned quinacridone pigment to take place when carrying out a process of the present invention. The liquid may be an organic liquid or a low-melting solid that liquefies during grinding. Examples of suitable organic liquids are $C_1$–$C_8$ alcohols, such as methanol, ethanol; $C_2$–$C_4$ diols such as ethylene glycol, propylene glycol, glycerin, or diethylene glycol; and amides, such as formamide, dimethylformamide, or N-methylpyrrolidone. A preferred organic liquid is glycol, more preferred is diethylene glycol.

The liquid may generally be present in an amount ranging from 0.8 to 2 parts by weight of the crude quinacridone pigment and preferably 1.2 to 1.4 parts by weight.

Quinacridone Derivative

Suitable quinacridone derivatives include but are not limited to phthalimidoalkyl-quinacridones such as 2-phthalimidomethyl-quinacridone; imidazolyl-alkyl-quinacridones such as imidazolylmethyl-quinacridone; quinacridone sulfonic acids; pyrazolylalkyl-quinacridones such as pyrazolylmethyl-quinacridone; dialkylaminoalkyl-sulfonamide derivatives of quinacridones such as dimethylaminopropyl-quinacridone-monosulfonamide and dimethylaminopropylquinacridone-disulfonamide. The quinacridone derivative acts as a particle size growth inhibitor during the attrition process and also provides better dispersion stability in application vehicles. The quinacridone derivative may be added in an amount ranging from 0.1 to 10%, preferably 2 to 6%, based on the weight of pigment crude.

Process

The present invention is a method for preparing a quinacridone pigment having a small particle size by combining crude quinacridone pigment with an inorganic salt, organic liquid and a quinacridone derivative in milling or grinding equipment. The temperature is elevated and the combination is ground under high shear conditions so that the crude quinacridone pigment can be broken down into small crystals.

Any grinding apparatus for example; Bead mill, Open-sieve mill, Closed-sieve mill, Gap separation mill, John mill, Tex mill, Dyno mill, STS mill, Electronically controlled Cobra mill, Boa 251 mill, Co-ball mill, etc., can be used, insofar as it permits temperature control and application of strong shear force. The wet grinding is generally conducted at 60 to 120° C., with 80 to 90° C. being preferred. The grinding operation is continued for a time sufficient to reduce the particle size of the quinacridone pigment to a range of 20 to 80 nm, with a time of between 3 to 6 hours generally being sufficient.

Following completion of the grinding step, the ground mixture is discharged into water and the pH of the aqueous mixture is adjusted by the addition of an acid to a value of or less than 1.5, preferably to within a pH range of 1.0 to 1.5. Thereafter, the temperature of this aqueous mixture is elevated to about 80 to 95° C., preferably to about 85 to 95° C., for a period of from about 1 to 3 hours, preferably from about 2 to 2.5 hours. The aqueous mixture is then cooled to about 50° C. and the conditioned quinacridone pigment is recovered as a filtercake by filtration. The filtercake is washed to a neutral pH by water and dried.

The process produces a quinacridone having a mean particle size range of from 0.020 um to 0.080 um. Such products are of special value in ink jet printing and in the electrophotographic application. However, its small particle and high transparency are also of general value in coatings, plastics and other ink applications such as ink jet inks.

The present invention is further illustrated by the following non-limiting examples in which all parts and percentages of components are by weight and based on the total weight of the composition, unless otherwise indicated.

EXAMPLE 1

Sodium chloride (500 g), diethylene glycol (90 g), dimethylquinacridone crude (50 g), and phthalimidomethylquinacridone (2.5 g) were mixed and ground at 85–90° C. for 4 hours, then discharged into 5 liter of water. The resulting water slurry was combined with concentrated hydrochloric acid (13 g) and the pH was maintained below 1.5. The acidic mixture was maintained at a temperature of 85–95° C. for 2½ hours and then cooled to 50° C. After filtration, washing and drying, the resulting quinacridone product had a particle size at about 40–60 nm.

EXAMPLE 2

Sodium chloride (200 g), diethylene glycol (2.4 g), beta-quinacridone crude (20 g), phthalimidomethylquinacridone (0.6 g), and quinacridone sulfonic acidaluminum salt (0.6 g) were mixed and ground at 85–90° C. for 4 hours, then discharged into 3 liter of water. The resulting slurry was combined with concentrated hydrochloric acid (5 g) and the pH was maintained below 1.5. The acidic mixture was maintained at a temperature of 90–95° C. for 2 hours and then cooled to 50° C. After filtration, the resulting presscake was washed with water to neutralize it and dried at 70–80° C. The resulting quinacridone product was considerably dark and intense in oil rubout and had a particle size ranging from 20–80 nm.

The invention has been described in terms of preferred embodiments thereof, but is more broadly applicable as will be understood by those skilled in the art. The scope of the invention is only limited by the following claims.

What is claimed is:

1. A process for preparing a quinacridone pigment comprising:
   (a) grinding a crude quinacridone pigment in the presence of
      (i) an inorganic salt,
      (ii) an organic liquid in which the crude quinacridone pigment and salt are substantially insoluble, and
      (iii) a quinacridone pigment derivative in an amount less than 10 wt. % relative to the weight of the crude quinacridone pigment;
   (b) discharging the crude quinacridone pigment from step (a) into water, thereby attaining a water pigment mixture;
   (c) adding to the water pigment mixture of step (b), an acid in an amount sufficient to adjust the pH of the mixture to 1.5 or lower; and
   (d) isolating from the mixture a quinacridone pigment having a particle size ranging from 20 to 80 nm.

2. The process of claim 1, wherein the crude quinacridone pigment has the following formula:

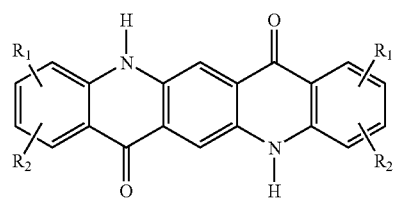

wherein substituents R1 and R1 are identical or different and are independently selected from hydrogen, chlorine, bromine or fluorine atoms or $C_1$ to $C_4$ alkyl.

3. The process of claim 1, wherein the inorganic salt is sodium chloride, potassium chloride, calcium chloride, zinc chloride, aluminum chloride, sodium sulfate, aluminum sulfate, calcium carbonate, sodium acetate, calcium acetate, sodium citrate, and potassium sodium tartrate.

4. The process of claim 3, wherein the inorganic salt is sodium chloride.

5. The process of claim 1, wherein the amount of inorganic salt ranges from about 3 to about 12 parts by weight of the crude quinacridone pigment.

6. The process of claim 5, wherein the amount of inorganic salt ranges from about 8 to about 10 parts by weight of the crude quinacridone pigment.

7. The process of claim 1, wherein the organic liquid is $C_1$ to $C_8$ alcohols, $C_2$ to $C_4$ diols, amides, and N-moiety pyridones.

8. The process of claim 7, wherein the organic liquid is diethylene glycol.

9. The process of claim 1, wherein the amount of organic liquid ranges from about 0.8 to about 2 parts by weight of the crude quinacridone pigment.

10. The process of claim 9, wherein the amount of organic liquid ranges from about 1.2 to about 1.4 parts by weight of the crude quinacridone pigment.

11. The process of claim 1, wherein the quinacridone derivative is selected from the group consisting of phthalimidoalkyl-quinacridones, imidazolylalkyl-quinacridones, quinacridone sulfonic acids, pyrazolylalkyl-quinacridones, and dialkylaminoalkylsulfonamide derivatives of quinacridones.

12. The process of claim 1, wherein the amount of quinacridone pigment derivative ranges from about 0.001 to about 0.1 parts by weight of the crude quinacridone pigment.

13. The process of claim 12, wherein the amount of quinacridone pigment derivative ranges from about 0.02 to about 0.06 parts by weight of the crude quinacridone pigment.

14. The process of claim 1, further comprising carrying out step (a) at a temperature ranging from about 60° C. to about 120° C.

15. The process of claim 14, further comprising carrying out step (a) at a temperature ranging from about 80° C. to 100° C.

16. The process of claim 1, wherein the acid is a mineral acid.

17. The process of claim 1, further comprising carrying out step (c) at a temperature ranging from about 80° C. to about 95° C.

18. A process for preparing a nanoscale quinacridone pigment comprising:
(a) grinding crude quinacridone pigment at a temperature ranging from about 80° C. to about 90° C. in the presence of:
  (i) an inorganic salt ranging from about 3 to about 12 parts by weight, relative to the crude quinacridone pigment, and
  (ii) an organic liquid in which the crude quinacridone pigment and salt are substantially insoluble ranging from about 0.8 to about 2 parts by weight, relative to the crude quinacridone pigment, and
  (iii) a quinacridone derivative selected from the group consisting of phthalimidoalkylquinacridones, imidazolylalkyl-quinacridones, quinacridone sulfonic acids, pyrazolylalkyl-quinacridones, and dialkylaminoalkyl-sulfonamide derivatives of quinacridones ranging from about 0.001 to about 0.1 parts by weight, relative to the crude quinacridone pigment;
(b) discharging the crude quinacridone pigment from step (a) into water; thereby attaining a water pigment mixture;
(c) adding to the water pigment mixture of step (b), an acid in an amount sufficient to adjust the pH of the mixture to 1.5 or lower; and
(d) isolating from the mixture a quinacridone pigment having a particle size ranging from about 20 to about 80 nm.

19. The process of claim 18, further comprising carrying out step (c) at a temperature ranging from about 80° C. to about 95° C.

20. The process of claim 18, wherein the inorganic salt is a sodium chloride which ranges from about 8 to about 10 parts by weight of the crude quinacridone pigment.

21. The process of claim 18, wherein the organic liquid is $C_1$ to $C_8$ alcohols, $C_2$ to $C_4$ diols, amides, and N-moiety pyridones.

22. The process of claim 21, wherein the organic liquid is a diethylene glycol.

23. The process of claim 22, wherein the amount of diethylene glycol ranges from about 0.02 to about 0.06 parts by weight of the crude quinacridone pigment.

24. The process of claim 18, wherein the amount of quinacridone derivative ranges from about 1.2 to about 1.4 parts by weight of the crude quinacridone pigment.

* * * * *